United States Patent
Voigt et al.

(10) Patent No.: US 10,099,312 B2
(45) Date of Patent: Oct. 16, 2018

(54) METHOD AND DEVICE FOR RESISTANCE WELDING AND COUPLING OF FORCES BETWEEN ELECTRODES

(71) Applicant: VOLKSWAGEN AKTIENGESELLSCHAFT, Wolfsburg (DE)

(72) Inventors: Alexander Voigt, Naunhof (DE); Matthias Graul, Brome (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 70 days.

(21) Appl. No.: 14/397,548

(22) PCT Filed: Apr. 26, 2013

(86) PCT No.: PCT/EP2013/058693
§ 371 (c)(1),
(2) Date: Oct. 28, 2014

(87) PCT Pub. No.: WO2013/160430
PCT Pub. Date: Oct. 31, 2013

(65) Prior Publication Data
US 2015/0122782 A1    May 7, 2015

(30) Foreign Application Priority Data
Apr. 28, 2012 (DE) .......... 10 2012 008 831

(51) Int. Cl.
*B23K 11/31* (2006.01)
*B23K 11/11* (2006.01)

(52) U.S. Cl.
CPC ........... *B23K 11/312* (2013.01); *B23K 11/115* (2013.01); *B23K 11/315* (2013.01); *B23K 11/318* (2013.01)

(58) Field of Classification Search
CPC ... B23K 11/115; B23K 11/312; B23K 11/315; B23K 11/318
(Continued)

(56) References Cited

U.S. PATENT DOCUMENTS 1,189,584 A    7/1916   Kicklighter
1,996,901 A *  4/1935   Burns ................ B23K 11/3009
                                                    219/87

(Continued)

FOREIGN PATENT DOCUMENTS

AT    368 046 B    8/1982
DE    672 682 C    3/1939
(Continued)

OTHER PUBLICATIONS

English translation of JPH10-230370.*
(Continued)

*Primary Examiner* — Geoffrey S Evans
*Assistant Examiner* — Renee Larose
(74) *Attorney, Agent, or Firm* — Pearl Cohen Zedek Latzer Baratz LLP

(57) ABSTRACT

A welding device for joining components by resistance welding includes a pair of electrodes which can introduce an electrode force and an electrical welding current $I_{S1}$ into the components, at least one further pair of electrodes which can introduce an electrode force and a further electrical welding current $I_{S2}$ into the components, a power source which can generate the electrode forces, a coupling link which is mechanically connected between the power source and the pairs of electrodes and which can divide a total electrode force that can be generated by the power source into the electrode force and the further electrode force.

7 Claims, 3 Drawing Sheets

(58) Field of Classification Search
USPC .................................................. 219/87, 86.33
See application file for complete search history.

(56) References Cited

U.S. PATENT DOCUMENTS

| | | | | |
|---|---|---|---|---|
| 4,048,463 A | * | 9/1977 | Bennett | B23K 11/115 219/118 |
| 4,130,750 A | * | 12/1978 | Bennett | B23K 11/115 219/118 |
| 5,111,019 A | * | 5/1992 | Torii | B23K 11/314 219/116 |
| 5,285,043 A | | 2/1994 | Smith | |
| 5,831,234 A | * | 11/1998 | Nakamura | B23K 11/318 219/86.25 |
| 6,806,436 B2 | | 10/2004 | Katou et al. | |
| 2002/0011470 A1 | * | 1/2002 | Domschot | B23K 11/115 219/86.8 |
| 2005/0056619 A1 | * | 3/2005 | Schmidt | B23K 11/31 219/90 |
| 2007/0131657 A1 | * | 6/2007 | Stieglbauer | B23K 11/30 219/86.25 |
| 2007/0199556 A1 | * | 8/2007 | Murai | B23K 11/115 126/20 |
| 2011/0272384 A1 | * | 11/2011 | Matsushita | B23K 11/115 219/91.2 |
| 2014/0313679 A1 | * | 10/2014 | Artelsmair | B23K 11/241 361/748 |

FOREIGN PATENT DOCUMENTS

| | | | |
|---|---|---|---|
| DE | 2 263 068 A1 | 7/1973 | |
| DE | 2 16 662 A1 | 12/1984 | |
| DE | 602 12 943 T2 | 3/2007 | |
| DE | 10 2006 005 920 A1 | 8/2007 | |
| DE | 10 2007 063 432 A1 | 6/2009 | |
| EP | 0 418 395 A1 | 3/1991 | |
| EP | 1 844 889 A1 | 10/2007 | |
| GB | 1419078 | 12/1975 | |
| JP | 60-49877 A * | 3/1985 | |
| JP | S61 143775 U | 9/1986 | |
| JP | 09-122921 A * | 5/1997 | |
| JP | H10 230370 A | 9/1998 | |
| JP | 2001-087864 A * | 4/2001 | |
| JP | 2001 259851 A | 9/2001 | |
| JP | 2004-358509 A * | 12/2004 | |
| WO | WO 2004/062912 A1 | 7/2004 | |
| WO | WO 2008110635 A1 * | 9/2008 | B23K 11/315 |

OTHER PUBLICATIONS

Figures of JPH10-230370.*
Machine translation of Japan Patent document No. 2001-087,864, Jul. 2017.*
Machine translation of Japan Patent document No. 2004-358,509, Jul. 2017.*
International Search Report issued for International Application No. PCT/EP2013/058693, dated Sep. 26, 2013.
German Search Report issued for German Application No. DE 10 2012 008 831.0, dated Feb. 21, 2013.
Office Action for Chinese Patent Application No. 201380021723.3, dated Mar. 27, 2017.

* cited by examiner

US 10,099,312 B2

METHOD AND DEVICE FOR RESISTANCE WELDING AND COUPLING OF FORCES BETWEEN ELECTRODES

CROSS-REFERENCE TO RELATED APPLICATIONS

This application is a National Phase Application of PCT International Application No. PCT/EP2013/058693, International Filing Date Apr. 26, 2013, claiming priority to German Patent Application No. 10 2012 008 831.0, filed Apr. 28, 2012, both of which are hereby incorporated by reference in their entirety.

FIELD OF THE INVENTION

The invention relates to a welding device for joining components by means of resistance welding, and it also relates to a method that can be carried out by means of the welding device.

BACKGROUND OF THE INVENTION

In an effort to achieve greater automation, resistance welding is a frequently employed joining method in car body manufacturing. Robot welding tongs are known that generate a welding spot in conjunction with a target position and in conjunction with a work cycle. In the case of large components with long rows of welding spots, this results in relatively long cycle times and/or in the need for several welding stations. In order to increase productivity, it is a known procedure to use welding tongs that can apply two welding spots per target position and per work cycle. German patent application DE 10 2006 005 920 A1 describes a resistance welding method for welding three components. One component has to be configured as a hollow profile. The welding current is applied by two electrodes. Moreover, other methods are known with which indirect double-spot welding is carried out, whereby these methods can be used in cases of access from one side. For the double-spot welding method, devices are known that have two welding electrodes arranged next to each other. Here, it is especially a known approach to move the welding electrodes in a lengthwise direction, especially in order to join sheet metal stacks of different thicknesses. Moreover, welding devices are known in which two welding electrodes that are arranged parallel to each other can be pivoted in order to properly follow curved surfaces of the components that are to be joined. Moreover, welding electrodes arranged parallel to each other are known that are impinged with a spring force. Finally, welding electrodes arranged parallel to each other are known to which an electrode force can be transmitted by means of spheres. Examples of such methods and/or devices are disclosed in German patent application DE 2 263 068 A1, DE 602 12 943 T2 (translation of EP patent), German patent application DE 10 2007 063 432 A1, European patent application EP 1 844 889 A1, East German provisional economic patent DD 216 662 A1 as well as U.S. Pat. No. 5,285,043.

SUMMARY OF THE INVENTION

The objective of the invention is to more precisely set an electrode force in the case of multi-spot welding, particularly to provide an identical electrode force to every single electrode, especially to provide an alternative solution.

This objective is achieved by a welding device (1) for joining components by means of resistance welding, the welding device (1) including: an electrode pair (15) which can introduce an electrode force (21) and an electric welding current IS1 into the components; at least another electrode pair (17) which can introduce another electrode force (23) and another electric welding current $I_{S2}$ into the components; a source of force (19) which can generate the electrode forces (21, 23), a distribution linkage (25) which is mechanically connected between the source of force (19) and the electrode pairs (15, 17) and which can divide a total electrode force (27) that can be generated by the source of force (19) into the electrode force (21) and the other electrode force (23), whereby the electrode pair (15) has a moving welding electrode (39) and the other electrode pair (17) has another moving welding electrode (41), and whereby the moving welding electrode (39) is mounted so that it can be moved lengthwise by means of a linear guide (43), and the other moving welding electrode (41) is mounted so that it can be moved lengthwise by another linear guide (45).

Advantageously, by means of the distribution linkage, the total electrode forces can be divided very precisely into the individual electrode forces. Advantageously, only a single source of force has to be provided so that the welding device can be constructed to be altogether smaller.

Advantageously, the welding electrodes are mounted so that they can be moved lengthwise, whereby, making use of this lengthwise mobility, they can approach the components that are to be joined in order to transmit the welding current and/or they can be put or pressed in place there by means of the electrode forces. In this context, the moving welding electrode is mounted so that it can be moved lengthwise by means of a linear guide, and the other moving welding electrode is mounted so that it can be moved lengthwise by means of another linear guide. Therefore, the moving welding electrodes are mounted so that they can be moved lengthwise axis-parallel relative to each other. The one welding electrode can thus be moved lengthwise axis-parallel relative to the other welding electrode.

In one embodiment of the welding device, the source of force (19) is configured as a linear source of force.

Advantageously, by means of a linear movement, the linear source of force can generate a force that can be converted by the distribution linkage into rotational movements and back again into linear movements in order to generate the individual electrode forces.

In another embodiment of the welding device, the distribution linkage (25) is mechanically associated with the electrode pair (15) by means of a joint (29), that is mechanically associated with the other electrode pair (17) by another joint (31), and that is mechanically associated with the source of force (19) by a distribution joint (33) that is arranged between the joint (29) and the other joint (31).

Advantageously, the total electrode force can be distributed by means of a distribution linkage. For this purpose, the distribution linkage can execute tilting movements or pivoting movements around the distribution joint, whereby tolerances and/or different material thicknesses of the components that are to be joined can advantageously be compensated for.

In another embodiment of the welding device, the electrode forces can be advantageously transmitted via the moving welding electrodes to components that are to be joined.

In one embodiment of the welding device, the distribution linkage (25) has a force transmission linkage (20) that is mechanically associated with the electrode pair (15), and it has another force transmission linkage (47) that is mechanically associated with the other electrode pair (17), and the electrode forces (21, 23) can be transmitted by these force transmission linkages.

Advantageously, force transmission linkages can compensate for equivalent movements of the distribution linkage in the crosswise direction of the electrode pair stemming from pivoting movements of the distribution linkage. Corresponding bearing forces can advantageously be taken up by means of the linear guides.

In one embodiment of the welding device, the force transmission linkage (20) is articulated to the distribution linkage (50) by the joint (29), and it is articulated to the moving welding electrode of the electrode pair (15) by a force transmission joint (49), and the other force transmission linkage (47) is articulated to the distribution linkage (50) by the other joint (31), and it is articulated to the other moving welding electrode (41) of the other electrode pair (17).

Advantageously, the electrode force in question can be transmitted by means of the force transmission linkages and the joints, whereby advantageously, a compensation can be made in the crosswise direction of the electrode pairs.

In one embodiment of the welding device, a rod (10) of the source of force (19) that can be moved lengthwise serves to transmit the total electrode force (27) and said rod (10) is articulated to the distribution linkage (25) by the distribution joint (33).

Advantageously, the total electrode force generated by the source of force can be transmitted via its rod to the distribution linkage and via the distribution joint. This advantageously divides the total electrode force into the individual electrode forces.

In one embodiment of the welding device, the distribution joint (33) is positioned in the middle between the joints (29, 31) of the distribution linkage (25).

Advantageously, owing to the centered positioning of the distribution joint, the total electrode force can be divided exactly in half, so that advantageously the individual electrode forces are of equal magnitude. As an alternative or in addition, however, the distribution joint can be arranged in any desired position or distribution between the joints of the distribution linkage, whereby a different force distribution among the electrode pairs arises in accordance with the law of the lever. As an alternative or in addition, it is possible to provide many distribution linkages, whereby any desired number of electrode pairs can be provided that each receive a portion of the total electrode force. The described principle can be multiplied for powers of two. For intermediate sizes, it is possible to provide distribution linkages with which only one electrode pair is associated, whereby one side of such a distribution linkage is associated with a given electrode pair, while the other side is rotatably mounted on the force output side so as to move along with the source of force. As a result, advantageously, a force attenuation and/or a force intensification can take place. As a result, advantageously, many individual electrode forces can be set and distributed among the appertaining electrode pairs. Advantageously, coupling joints function with low losses and are simple to design. Besides, they take up relatively little space.

The objective is also achieved by a method involving: generating a total electrode force (27); dividing the total electrode force (27) between an electrode pair (15) and another electrode pair (17) by a distribution linkage (25) and, as a result, pressing the components against each other that are arranged between the electrode pairs (15, 17); introducing a welding current $I_{S1}$ and another welding current $I_{S2}$ into the components via the electrode pairs (15, 17) in order to weld the components by means of resistance welding. The method is carried out especially by means of a welding device as described above. The advantages as described above are achieved.

BRIEF DESCRIPTION OF THE DRAWINGS

Additional advantages, features and details of the invention can be gleaned from the description below in which embodiments are described in depth making reference to the drawing. The same, similar, and/or functionally equivalent parts are designated by the same reference numerals. The following is shown.

DETAILED DESCRIPTION OF THE INVENTION

Figure 1:
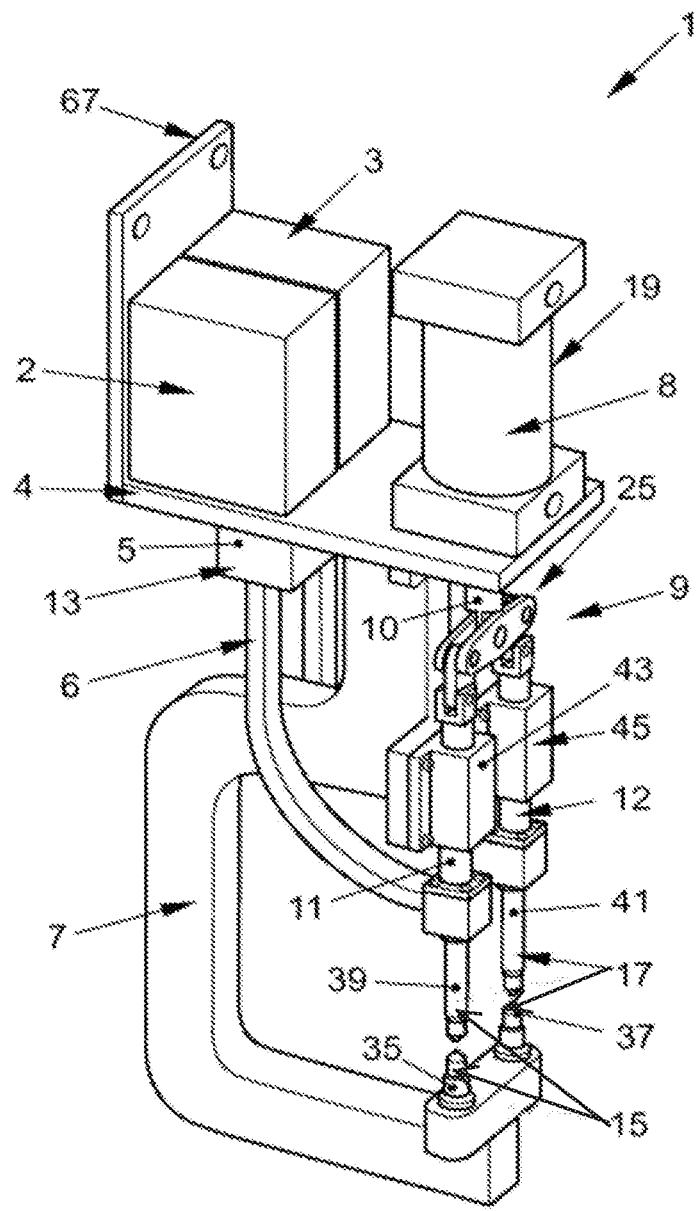
FIG. 1 a three-dimensional front view at an angle from above of a welding device having two electrode pairs.

FIG. 1 shows a three-dimensional front view at an angle from above of a C-bracket 7 of a welding device 1. The welding device 1 has an electrode pair 15 and another electrode pair 17. Two or more components that are to be joined can be positioned between the electrode pairs 15, 17. A total electrode force 27 is exerted onto the electrode pairs 15 and 17 by means of a source of force 19. In this manner, the components that are to be joined are temporarily secured between the electrode pairs 15, 17 and pressed together in such a way that two welding currents supplied by a welding transformer 2 and by another welding transformer 3 cause the material of the components that are to be joined to melt, at least in certain areas, as a result of which the components are joined at two joining spots by means of resistance welding.

The welding transformers 2 and 3 are connected via secondary current cables 6 to moving welding electrodes 39, 41 of the electrode pairs 15, 17. The current flows via fixed welding electrodes 35, 37 of the electrode pairs 15, 17, and finally back to the welding transformers 2 and 3 via the C-bracket 7.

The moving welding electrode 39 is mounted so that it can be moved lengthwise by means of a linear guide 43. The other moving welding electrode 41 is mounted so that it can be moved lengthwise by means of another linear guide 45, and in particular, the moving welding electrodes 39 and 41 are mounted so that they can be moved lengthwise axis-parallel.

The source of force 19, which is especially configured as a pneumatic cylinder, transmits the total electrode force 27 via a rod 10 to an advantageous distribution linkage 25. By means of the distribution linkage 25, the total electrode force 27 is divided into the individual electrode forces 21 and 23. For the further transmission, the moving electrodes 39 and 41 are mounted by means of sliding shafts 11 and 12 in the linear guides 43 and 45 so that they can be moved lengthwise.

One current measuring coil 13 is connected in the welding current circuits for each electrode pair in order to ascertain the welding current.

Figure 2:
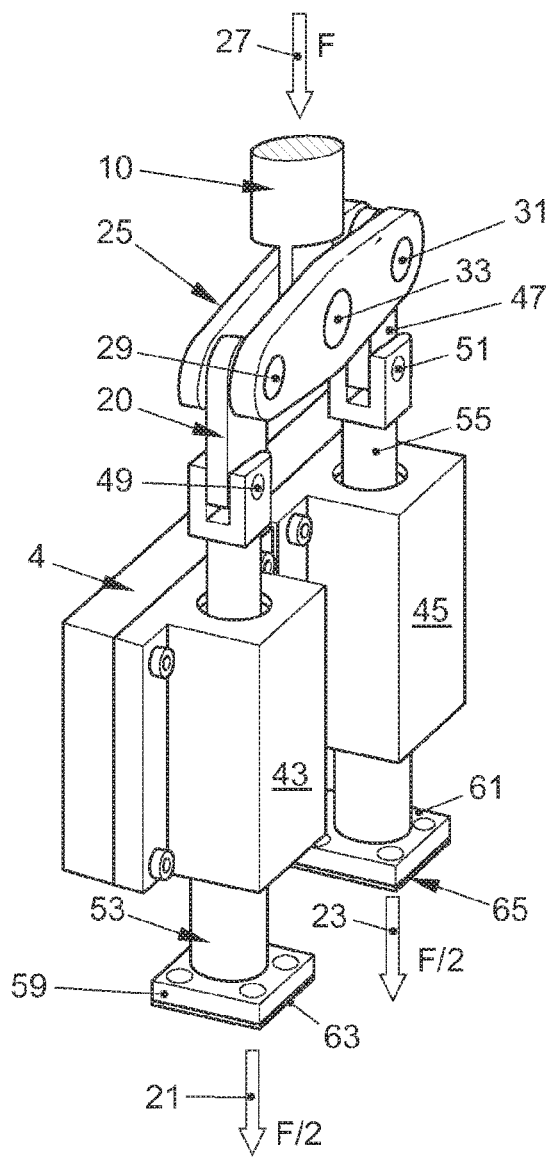
FIG. 2 a three-dimensional front view at an angle from above of a coupling joint of the welding device shown in FIG. 1.

FIG. 2 shows a detailed view of the welding device of FIG. 1, likewise in a three-dimensional front view at an angle from above, whereby the coupling joint 25 and the linear guides 43 and 45 are shown.

The interaction of the coupling joint 25 with the linear guides 43 and 45, and thus the division of the total electrode force 27 into the electrode force 21 of the electrode pair 15 and into the other electrode force 23 of the other electrode pair 17 will be explained in greater detail below.

FIG. 2 shows a detailed view of the welding device of FIG. 1, likewise in a three-dimensional front view at an angle from above, whereby the distribution linkage 25 and the linear guides 43 and 45 are shown.

The interaction of the distribution linkage 25 with the linear guides 43 and 45, and thus the division of the total electrode force 27 into the electrode force 21 of the electrode pair 15 and into the other electrode force 23 of the other electrode pair 17 will be explained in greater detail below.

The distribution linkage 25 is articulated to the rod 10 by means of the distribution linkage 33. The distribution linkage 25 has other joints on both sides of the distribution linkage 33, namely, a joint 29 and another joint 31. A force transmission linkage 20 is articulated to the distribution linkage 25 by means of the joint 29. Another force transmission linkage 47 is articulated to the distribution linkage 25 by means of another joint 31.

The total electrode force 27 of the source of force 19 is transmitted via the rod 10 that is configured, for example, as a piston rod of a pneumatic cylinder.

The distribution linkage 25 fulfills the function of a compensation rocker and/or of a tilting lever.

The force transmission linkages 20, 47 serve to transmit the electrode force 21 to the electrode pair 15, and to transmit the other electrode force 23 to the other electrode pair 17. For this purpose, the force transmission linkage 20 is articulated to the sliding shaft 53 of the electrode pair 15 by means of a force transmission joint 49. In order to transmit the other electrode force 23, the other force transmission linkage 47 is articulated by means of another distribution joint 51 to the other sliding shaft 55 of the other linear guide 45 of the other electrode pair 17.

In order to transmit the electrode forces 21 and 23 to the moving welding electrode 39 and to the other moving welding electrode 41, the ends of each of the sliding shafts 53 and 55 opposite from the force transmission joints 49 and 51 have an electrode holder 59 or another electrode holder 61. In the direction of action of the electrode force 21, there is an electric insulator 63 below the electrode holder 59. Likewise, below the other electrode holder 61, there is another electric insulator 65. Thanks to this measure, it is possible to avoid a shunt via the compensation mechanism. The electrode holders 59, 61 each have four through holes via which a connection can be established between the appertaining sliding shaft 53, 55 and the appertaining moving welding electrode 39 and 41.

In another embodiment, the two electric circuits are electrically insulated from each other in order to avoid a shunt.

According to one embodiment, the source of force 19 is configured as a pneumatic device and, for this purpose, it has a pneumatic cylinder 8.

The distribution joint 33 is a force path compensation device 9 and it converts a linear movement of the rod 10 of the pneumatic cylinder 8 first into pivoting and rotating movements of the distribution linkage 25 and of the force transmission linkages 20, 47. These pivoting and rotating movements are then converted back into linear movements of the sliding shafts 53 and 55. In this manner, the total electrode force 27 is advantageously divided into the individual electrode forces 21 and 23. Consequently, due to the pivoting movement of the distribution linkage 25, a tolerance compensation is achieved in the lengthwise direction of the linear guides 43 and 45. In spite of this tolerance compensation, advantageously, the total electrode force 27 is consistently distributed identically owing to the kinematics of the distribution linkage 25. This is advantageously not dependent on the pivoting position of the distribution linkage 25, but rather only on the position of the distribution joint 33 relative to the joints 29 and 31. In one embodiment, the distribution joint 33 is arranged exactly in the center between the joints 29 and 31, so that the electrode forces 21 and 23 are identical. Advantageously, the distribution linkage 25 is designed symmetrically, so that even the bearing forces that occur in the linear guides 43 and 45 as well as in the joints 29, 31, 49, 51 are likewise compensated for.

When it comes to a divergent force distribution, it is possible to arrange the distribution joint 33 of the distribution linkage 25 in an asymmetrical division between the joints 29 and 31. Furthermore, it is conceivable to apply the principle of the distribution linkage 25 to more than two electrodes. In this context, symmetrically structured coupling joints can be provided for powers of two. If the numbers are different from this, asymmetrically coupling joints can be provided whereby appertaining coupling joints are permanently articulated on one side, if applicable.

The linear guides 43 and 45 are screwed to a tong base element 4.

In order to associate the C-bracket 7 of the welding device 1 with a robot device, the latter has a robot fastening plate 67 that especially has screwed connections or through holes by means of which screwed connections can be established to the robot device.

Moreover, aside from the current measuring coil 13, a diode packet 5 is also provided in order to convert the welding current.

Figure 3:
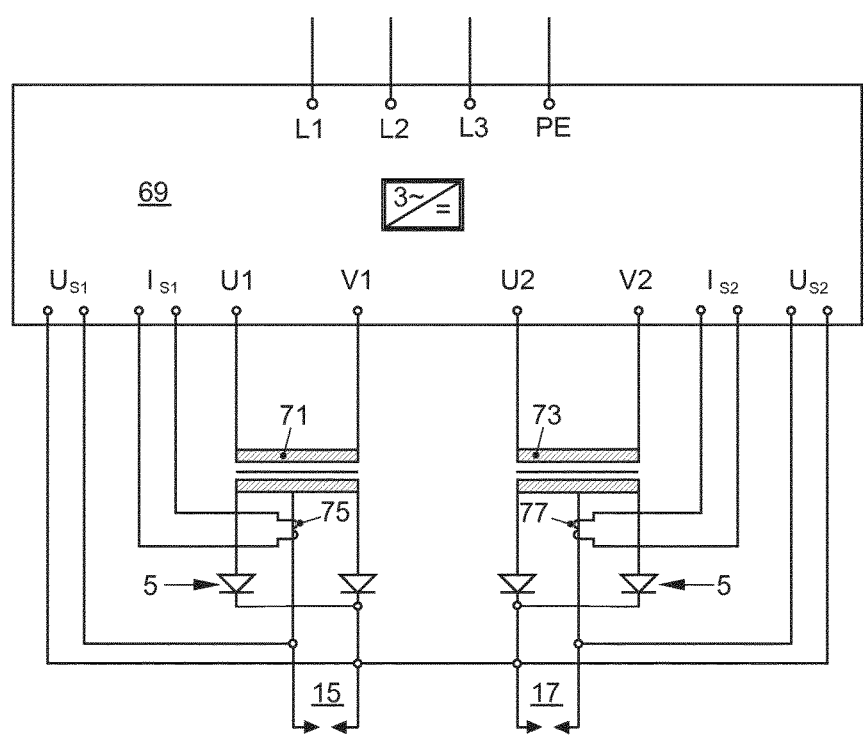
FIG. 3 a wiring diagram of a double inverter for distributing a welding current among the welding electrode pairs of the welding device shown in FIGS. 1 and 2.

FIG. 3 shows a wiring diagram of a double inverter 69.

In FIG. 3, the letters L1, L2, L3 and PE designate a connection to a power network, especially to a power current connection.

The double inverter 69 serves to generate an electric welding current $I_{S1}$ and another electric welding current $I_{S2}$. Appropriate measuring lines for the welding currents $I_{S1}$ and $I_{S2}$ are drawn in FIG. 3.

A primary circuit U1, V1 and U2, V2 is provided for each electrode pair 15, 17, respectively. Voltages of the primary circuits U1 and V1, U2 and V2 are transformed by means of a transformer 71 and by another transformer 73. One of the diode packets 5 is situated downstream from each of the transformers 71, 73.

Appropriate measuring lines are associated with each of the electrode pairs 15, 17 or their current circuits in order to measure a secondary voltage $U_{S1}$ and $U_{S2}$.

Advantageously, two or more welding points can be created per work procedure and/or per target position. Advantageously, this can markedly shorten the production time. Advantageously, a defined electrode force 21 and 23 is nevertheless possible per welding spot. Thus, in spite of the placement of multiple welding spots, a high quality and process reliability of the welding procedure can advantageously be ensured. Advantageously, the distribution linkage 25 or the force path compensation device 9 is a low-wear and functional mechanism that is advantageously relatively compact and low-maintenance in comparison to two sources of force provided individually. Advantageously, the individual electrode forces 21 and 23 can reach the range from 2 to 5 kN, especially from 2.5 to 3.5 kN, especially about 1.5 to 3 kN.

Advantageously, the process reliability is at the level of welding tongs having only one welding spot.

According to FIGS. 1 and 2, the welding device 1 is configured with a C-shaped design and it has a C-bracket 7 for this purpose. According to an advantageous additional aspect of the invention, however, the welding device 1 can also be configured with an X-shaped design, having so-called X-shaped welding tongs. For this purpose, the distribution linkage 25 can be provided at the end of the tongs, analogously to the depiction of FIGS. 1 and 2. The transmission from the source of force is then, if applicable, via the X-shaped welding tongs and not directly via the rod 10 of the source of force 19.

As an alternative or in addition, the source of force 19 can be configured in any desired manner, especially as a hydraulic source of force, and electric-motor source of force and/or the like.

The fixed welding electrodes 35, 37 and the moving welding electrodes 39 and 41 of the electrode pairs 15, 17 are attached to tong arms of the welding device 1 in such a way that, when the tongs of the welding device 1 close, the result is two electric circuits via the components that are to be welded or joined. These are two electric circuits that can be regulated independently of each other, especially by means of the double inverter 69 shown in FIG. 3, having separately actuated transformers 71 and 73. The regulation here is carried out via a current measuring coil 75 of the electrode pair 15 and via another current measuring coil 77 of the other electrode pair 17, which is shown in FIG. 3.

The welding tongs of the welding device 1 are equipped with the distribution linkage 25 of the force path compensation device 9, with which the total electrode force 27 generated by the tongs and/or the source of force 19 is divided between both electrode pairs 15, 17 at a given ratio, in this case, particularly in a ratio of 0.5:0.5, independently of the electrode position, in the area of the welding electrode in question, especially independently of the actual thickness of the components that are to be joined.

In this manner, reproducible welding results are advantageously ensured. In addition, a path compensation is generated by means of the linear guides 43, 45 in order to compensate for different amounts of milling debris and/or different total metal thicknesses. The linear guides 43, 45 can be configured as sliding bearings with shafts and/or sliding rails with linear ball bearing units, or else as a combination of both of these. The compensation is especially implemented up to a vertical offset of 20 mm. Advantageously, pairs of caps of the electrode pairs 15, 17 can be machined one after the other with conventional milling cutters. As an alternative or in addition, double milling cutters can be used.

A decisive advantage of the distribution linkage 25 of the force path compensation device 9 as compared to pneumatic cylinders oriented in parallel and/or servo motors is the fact that they occupy less space. As a result, the design freedom in terms of the joining materials in a production device is greatly enhanced. The distance between the electrode pairs 15, 17 or the linear guides 43 and 45 is especially between 20 mm and 300 mm, especially between 40 mm and 200 mm, especially between 50 mm and 180 mm, especially between 70 mm and 150 mm, especially between 90 mm and 100 mm. In the case of an electrode distance of, for example, 100 mm, welding spot distances of 50 mm, 33 mm, 25 mm or 20 mm can be achieved by means of so-called narrow gap welding. Accordingly, the electrode distance is divided into two, three, four or five individual distances by means of one, two, three or four inserted welding spots.

The described welding device 1, especially robot welding tongs, can likewise be equipped with a pneumatic or servo-motor tong compensation means. According to another aspect, in particular, a movement of a fixed electrode arm towards the components that are to be joined is achieved by means of a robot movement, especially a 7-axis function.

LIST OF REFERENCE NUMERALS 1 welding device
2 welding transformer
3 welding transformer
5 diode packet
6 secondary current cable
7 C-bracket
8 pneumatic cylinder
9 force path compensation device
10 rod
13 current measuring coil
15 electrode pair
17 electrode pair
19 source of force
20 force transmission linkage
21 electrode force
23 electrode force
25 distribution linkage
27 total electrode force
29 joint
31 joint
33 distribution joint
35 welding electrode
37 welding electrode
39 welding electrode
41 welding electrode
43 linear guide
45 linear guide
47 force transmission linkage
49 force transmission joint
51 force transmission joint
53 sliding shaft
55 sliding shaft
59 electrode holder
61 electrode holder
63 insulator
65 insulator
67 robot fastening plate
69 double inverter
71 transformers
73 transformers
75 current measuring coil
77 current measuring coil

The invention claimed is:

1. A welding device for joining components by resistance welding, comprising:
a double inverter configured to generate a first electric welding current $I_{S1}$ and to generate a second electric welding current $I_{S2}$,
a first electrode pair configured to introduce a first electrode force and the first electric welding current $I_{S1}$ into the components,
at least a second electrode pair configured to introduce a second electrode force and the second electric welding current $I_{S2}$ into the components, a single source of force configured to generate the electrode forces, and a distribution linkage which is mechanically connected between the single source of force and the electrode pairs, the distribution linkage configured to divide a total electrode force that is generated by the single source of force into the first electrode force and the second electrode force, wherein:

the distribution linkage is articulated to a first force transmission linkage by a first joint, the distribution linkage is articulated to a second force transmission linkage by a second joint, the first force transmission linkage is articulated to a first moving welding electrode of the first electrode pair by a first force transmission joint, the second force transmission linkage is articulated to a second moving welding electrode of the second electrode pair by a second force transmission joint, the electrode forces are transmitted by the first and second force transmission linkages, the single source of force is mechanically associated with the distribution linkage by a distribution joint that is arranged between the first joint and the second joint, and whereby the first moving welding electrode is mounted so that it is configured to be moved lengthwise by a first linear guide, and the second moving welding electrode is mounted so that it is configured to be moved lengthwise by a second linear guide.

2. The welding device according to claim 1, whereby the single source of force is configured as a linear source of force.

3. The welding device according to claim 1, whereby the first electrode pair has the first fixed welding electrode and the first moving welding electrode, and the second electrode pair has the second fixed welding electrode and the second moving welding electrode.

4. The welding device according to claim 1, whereby a rod of the single source of force that is configured to be moved lengthwise serves to transmit the total electrode force and said rod is articulated to the distribution linkage by the distribution joint.

5. The welding device according to claim 1, whereby the distribution joint is positioned in the middle between the first joint and the second joint.

6. A method for joining components by resistance welding, involving:

generating a total electrode force by a single source of force, dividing the total electrode force between an electrode pair and another electrode pair by a distribution linkage and, as a result, pressing the components against each other that are arranged between the electrode pairs, wherein:

the distribution linkage is articulated to a first force transmission linkage by a first joint, the distribution linkage is articulated to a second force transmission linkage by a second joint, the first force transmission linkage is articulated to the first electrode pair by a first force transmission joint, the second force transmission linkage is articulated to the second electrode pair by a second force transmission joint, the electrode forces are transmitted by the first and second force transmission linkages, and the single source of force is mechanically associated with the distribution linkage by a distribution joint that is arranged between the first joint and the second joint, and introducing a welding current $I_{S1}$ and another welding current $I_{S2}$ into the components via the electrode pairs in order to weld the components by resistance welding.

7. A welding device for joining components by resistance welding, comprising:

a plurality of electrode pairs configured to introduce electrode forces and electric welding currents into the components, each electrode pair of the plurality of electrode pairs having a respective distribution linkage; and a single source of force configured to generate the electrode forces;

wherein a first side of each distribution linkage is mechanically associated with a moving welding electrode of its respective electrode pair, and a second side of each distribution linkage is mechanically associated with the single source of force;

whereby each of the moving welding electrodes is mounted so that it is configured to be moved lengthwise by a linear guide.

* * * * *